(12) United States Patent  (10) Patent No.: US 9,294,586 B2
Hirosawa  (45) Date of Patent: Mar. 22, 2016

(54) INFORMATION PROCESSING SYSTEM, INFORMATION PROCESSING APPARATUS, SERVER, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventor: Teruyuki Hirosawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 267 days.

(21) Appl. No.: 13/764,152

(22) Filed: Feb. 11, 2013

(65) Prior Publication Data

US 2014/0108504 A1  Apr. 17, 2014

(30) Foreign Application Priority Data

Oct. 17, 2012  (JP) ................. 2012-229475

(51) Int. Cl.
*G06F 15/16* (2006.01)
*H04L 29/06* (2006.01)
*H04L 29/08* (2006.01)

(52) U.S. Cl.
CPC ............... *H04L 67/42* (2013.01); *H04L 67/06* (2013.01)

(58) Field of Classification Search
USPC .................................. 709/203, 220
See application file for complete search history.

(56) References Cited

U.S. PATENT DOCUMENTS

| 2007/0060359 | A1* | 3/2007 | Smith ............................ 463/42 |
| 2009/0210933 | A1* | 8/2009 | Shear et al. ....................... 726/6 |
| 2010/0064219 | A1* | 3/2010 | Gabrisko et al. .............. 715/716 |
| 2011/0314505 | A1* | 12/2011 | Cho et al. ....................... 725/62 |

FOREIGN PATENT DOCUMENTS

JP  9-171504  6/1997

* cited by examiner

*Primary Examiner* — El Hadji Sall
(74) *Attorney, Agent, or Firm* — Nixon & Vanderhye PC

(57) ABSTRACT

A production content is stored in a storage unit of a server in accordance with an operation on a terminal apparatus, a material content is selected from among a plurality of material contents so that the selected material content is used as a material to create the production content, and a request is made, from the terminal apparatus, to the server for creation of a production content associated with the selected material content. Then, a state of the request is presented to a plurality of terminal apparatuses.

23 Claims, 11 Drawing Sheets

FIG. 7

```
COMPOSITION REQUESTED BY YOU HAS BEEN POSTED
AND IS ALLOWED TO BE DOWNLOADED NOW.

COMPOSITION TITLE [AI NO MELODY]
    POSTER [YAMANE]
    COMPOSITION CODE [A0001]

IF YOU THANK THE POSTER,
    PRESS THE "THANK YOU" BUTTON.

[ THANK YOU ]
                  ‿
                  Bt              35
```

FIG. 8

```
    COMPOSITION TITLE [AI NO MELODY]
    POSTER [YAMANE]
    COMPOSITION CODE [A0001]

ALLOWED TO BE DOWNLOADED

COMPOSITION TITLE    DOWNLOAD CAPABILITY
AI NO UTA                ALLOWED
AI NO SHIRUSHI           ALLOWED           Cs
AI NO SHIRUSHI           ALLOWED
AI NO MELODY             ALLOWED
    [ RETURN ]        [ DOWNLOAD ]
                           ‿
                           Bd         35
```

F I G. 1 1
| REQUESTING USER | | REQUESTED COMPOSITION ID |
|---|---|---|
| USER ID | DEVICE ID | |
| AAAA | DAAAA | A0001 |
| BBBB | DBBBB | J1532 |
| CCCC | DCCCC | M3050 |
| CCCC | DCCCC | A0001 |
| ⋮ | ⋮ | ⋮ |

INFORMATION PROCESSING SYSTEM, INFORMATION PROCESSING APPARATUS, SERVER, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2012-229475, filed on Oct. 17, 2012, is incorporated herein by reference.

FIELD

The technology shown here relates to an information processing system, an information processing apparatus, a server, a storage medium having stored therein an information processing program, and an information processing method, and in particular, relates to an information processing system, an information processing apparatus, a server, and an information processing method that, for example, control the process of transmitting and receiving data via a server, and a storage medium having stored therein an information processing program that, for example, controls the process of transmitting and receiving data via a server.

BACKGROUND AND SUMMARY

Conventionally, there is known a system in which a work created by a user, such as a composition or a moving image, is evaluated in a website. For example, in the system, a work (a composition) submitted by a user is evaluated by another user, and the evaluation result is transmitted to a server of an information provider via the Internet, so that the ranking table of submitted works disclosed by the information provider reflects the evaluation result.

In the system, however, a user who creates a work to be submitted cannot grasp in advance what kind of work is needed by another user who is to evaluate the submitted work. This makes it likely that the user creates a work having low demand, which results in receiving acceptance only from a small portion of users.

Therefore, it is an object of an exemplary embodiment to provide an information processing system, an information processing apparatus, a server, and an information processing method that enable the creation of a content expected by another user, and a storage medium having stored therein an information processing program that enables the creation of a content expected by another user.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of an information processing system according to the exemplary embodiment is an information processing system includes at least one server and a plurality of terminal apparatuses. The information processing system includes a production content storage control unit, a selection unit, a request unit, and a state presentation unit. The production content storage control unit stores a production content in a storage unit of the server in accordance with an operation on each terminal apparatus. The selection unit allows a material content to be selected from among a plurality of material contents so that the selected material content is used as a material to create the production content. The request unit makes a request from the terminal apparatus to the server for creation of a production content associated with the selected material content. The state presentation unit presents a state of the request to the plurality of terminal apparatuses.

On the basis of the above, a user selects a material content from among a plurality of material contents (for example, compositions), and thereby can request another user to create a production content using the selected material content as a material. Then, the state of the request from the user is presented to the other user serving as a producer who creates the production content. This enables the creation of a production content as a result of the user themselves narrowing down elements to be used for the production content.

In addition, the information processing system may further include a material content setting unit. The material content setting unit sets, at least from among the plurality of material contents for which the request is allowed to be made, a material content to be associated with the production content to be stored in the storage unit. In this case, when storing the production content in the storage unit, the production content storage control unit may store the production content together with data representing the material content set in association with the production content.

On the basis of the above, the production content is stored together with data representing the material content used as a material, which enables the management of a production content in association with a requested option (material content).

In addition, the information processing system may further include a production content creation unit. The production content creation unit, in accordance with an operation on a terminal apparatus, creates the production content using as a material a material content selected from among the plurality of material contents for which the request is allowed to be made.

On the basis of the above, the user of a terminal apparatus can create a production content using as a material a material content selected from among the plurality of material contents.

In addition, on the basis of a first application, the request unit may make a request for creation of a production content to be used in predetermined information processing. The information processing system may further include an information processing unit. The information processing unit performs the information processing using the production content on the basis of the first application.

On the basis of the above, the execution of a first application makes it possible to perform a series of processes including the process of requesting a production content and information processing using the production content.

In addition, the information processing system may further include a viewing unit and a production content creation unit. The viewing unit allows viewing of the state of the request using the terminal apparatus on the basis of the first application. The production content creation unit creates the production content using the terminal apparatus on the basis of the first application. In this case, on the basis of the first application, the production content storage control unit may store the production content created by the production content creation unit in the storage unit.

In addition, the information processing system may further include a viewing unit and a production content creation unit.

The viewing unit allows viewing of the state of the request using the terminal apparatus on the basis of a second application. The production content creation unit creates the production content using the terminal apparatus on the basis of the second application. In this case, on the basis of the second application, the production content storage control unit may store the production content created by the production content creation unit in the storage unit.

On the basis of the above, the execution of a first application makes it possible to perform a series of processes including the process of viewing a request, the process of creating a production content, and the process of storing the production content in a storage unit.

In addition, the request unit may set as a destination of the request a predetermined server determined by the first application.

On the basis of the above, each terminal apparatus executes the first application, whereby a predetermined server determined by the application can aggregate requests from the terminal apparatuses.

In addition, the state presentation unit may include a request management unit. The request management unit aggregates and manages all the requests. In this case, using the requests aggregated by the request management unit, the state presentation unit may present a result of adding up the requests to the plurality of terminal apparatuses.

On the basis of the above, requests are aggregated, whereby it is possible to easily grasp the tendency of other users' needs.

In addition, the information processing system may further include a requesting user list storage unit and a notification unit. The requesting user list storage unit stores a requesting user list for managing the material content indicated by the request and a user having made the request. The notification unit, if the production content has been stored in the storage unit, notifies, on the basis of the requesting user list, all the users having requested creation of the production content that the production content has been stored in the storage unit.

On the basis of the above, all the users having made requests can know that a production content based on the requests has been created. Further, it is possible to establish a novel data transmission/reception system in which a user having made a request is notified of the state of response to the request, while information regarding the user having made the request is anonymous to another user who creates a production content.

In addition, the information processing system may further include a notification unit and a reply unit. The notification unit, if the production content has been stored in the storage unit, notifies a user having requested creation of the production content of data representing a user having created the production content, and also notifies the user having requested creation of the production content that the production content has been stored in the storage unit. The reply unit, on the basis of the data representing the user of which the notification has been made, sends or presents predetermined data to the user having created the production content of which the notification has been made.

On the basis of the above, it is possible to easily reply to a user having responded to a request. Further, it is possible to establish a novel data transmission/reception system in which a user having made a request can reply to another user who creates a production content, while information regarding the user having made the request is anonymous to the other user.

In addition, the state presentation unit may present the state of the request to the plurality of terminal apparatuses without presenting information enabling identification of a user having made the request.

On the basis of the above, the anonymity of a user who makes a request is maintained, which makes it possible to generate an environment where it is easy to make a request.

In addition, the exemplary embodiment may be carried out in the forms of an information processing apparatus including at least some of the above units, a server including at least some of the above units, a computer-readable storage medium having stored therein an information processing program that causes a computer to execute at least part of the operations performed by the above units, and an information processing method including the operations performed by the above units.

On the basis of the exemplary embodiment, a user selects a material content from among a plurality of material contents (for example, compositions), and thereby can request another user to create a production content using the selected material content as a material. Then, the state of the request from the user is presented to the other user serving as a producer who creates the production content. This enables the creation of a production content as a result of the user themselves narrowing down elements to be used for the production content.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 7 is a diagram showing a non-limiting example of an image in which a notification is displayed on the display section 35 when a requested production content has been uploaded;

FIG. 8 is a diagram showing a non-limiting example of an image displayed on the display section 35 when the production content is downloaded to the terminal apparatus 3;

FIG. 11 is a diagram showing a non-limiting example of request list data Dn stored in the storage section 203;

DETAILED DESCRIPTION OF NON-LIMITING EXAMPLE EMBODIMENTS

Figure 1:
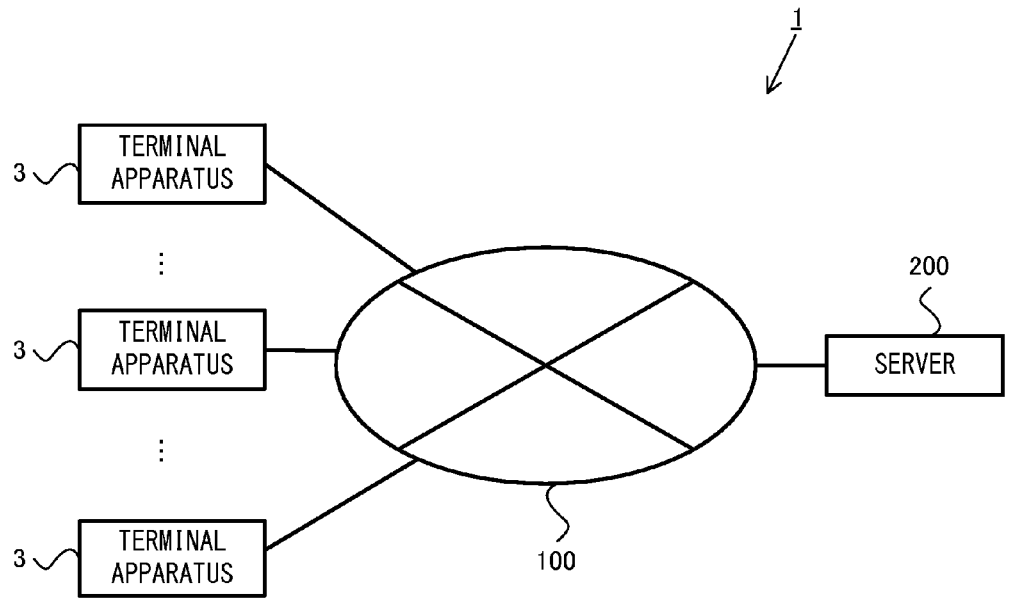
FIG. 1 is a diagram showing a non-limiting example of an information processing system according to an exemplary embodiment.

With reference to FIG. 1, an information processing system according to an exemplary embodiment is described. As shown in FIG. 1, a display control system 1, which is an example of the information processing system, is constructed by the connection between a plurality of terminal apparatuses 3 and a server 200 via a network 100.

Each terminal apparatus 3 is configured to be connected to the network 100 using wireless or wired communication, and forms a client/server system with the server 200. For example, the terminal apparatus 3 can execute a predetermined application (for example, a game application). Further, the terminal apparatus 3 establishes connection with the server 200 via the network 100 by executing the predetermined application, and thereby can communicate with the server 200. For example, the terminal apparatus 3 can execute an information processing program stored in a storage medium such as an exchangeable memory card or an exchangeable optical disk, or received from another apparatus. The terminal apparatus 3 may be a device such as a general personal computer, a stationary game apparatus, a mobile phone, a handheld game apparatus, or a PDA (Personal Digital Assistant).

Figure 2:
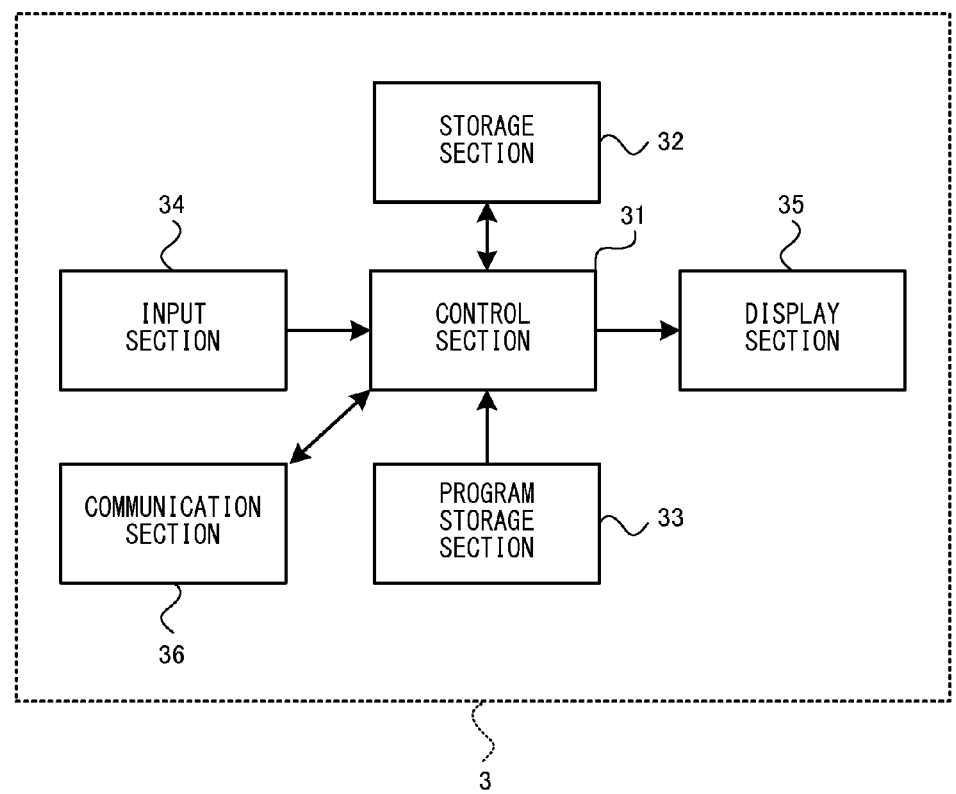
FIG. 2 is a block diagram showing a non-limiting example of the configuration of each terminal apparatus 3 of FIG. 1.

Next, with reference to FIG. 2, the terminal apparatus 3 is described. It should be noted that FIG. 2 is a block diagram showing an example of the configuration of the terminal apparatus 3. In FIG. 2, the terminal apparatus 3 includes a control section 31, a storage section 32, a program storage section 33, an input section 34, a display section 35, and a communication section 36. It should be noted that the terminal apparatus 3 may include one or more apparatuses containing: an information processing apparatus having at least the control section 31; and another apparatus.

The control section 31 is information processing means (a computer) for performing various types of information processing, and is, for example, a CPU. For example, the control section 31 has the functions of executing the application to perform game processing using various contents described later, data transmission/reception process via the server 200, and the like, as the various types of information processing. For example, the above functions of the control section 31 are achieved, for example, as a result of the CPU executing a predetermined program.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus having the control section 31, or may be a storage medium detachably attached to the information processing apparatus having the control section 31. Alternatively, the program storage section 33 may be a storage device (a server or the like) connected to the control section 31 via a network. The control section 31 (the CPU) may read some or all of the program to the storage section 32 at appropriate timing, and execute the read program.

The input section 34 is an input apparatus that can be operated (subjected to a character input operation performed) by a user. The input section 34 may be any input apparatus.

The display section 35 displays an image in accordance with an instruction from the control section 31.

The communication section 36 is formed of a predetermined communication module. The communication section 36 transmits and receives data to and from another device via the network 100, and transmits and receives data to and from the other terminal apparatuses 3.

Figure 3:
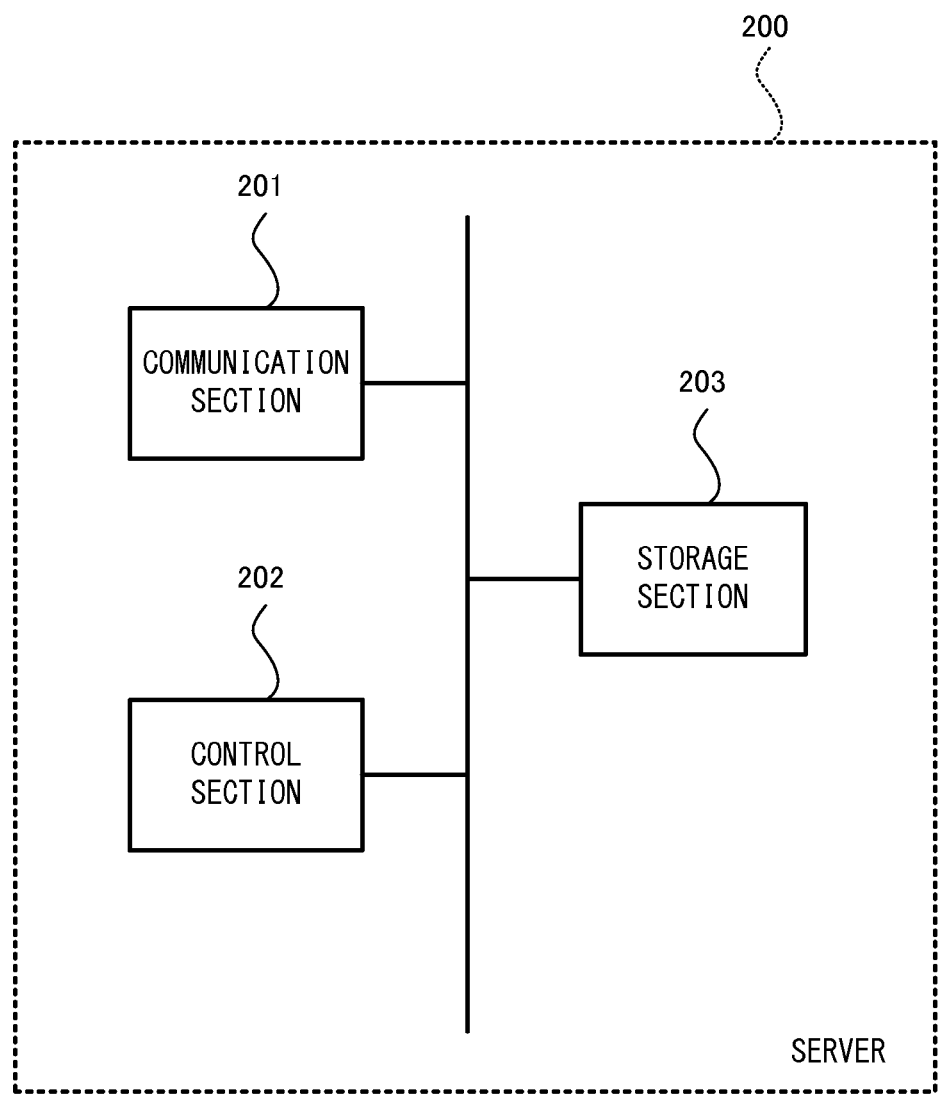
FIG. 3 is a block diagram showing a non-limiting example of the configuration of a server 200 of FIG. 1.

Next, with reference to FIG. 3, the server 200 is described. It should be noted that FIG. 3 is a block diagram showing an example of the configuration of the server 200.

The server 200 includes a communication section 201, a control section 202, and a storage section 203. The communication section 201 transmits and receives communication packets, thereby communicating with the plurality of terminal apparatuses 3 and the like via the network 100. The control section 202 performs: the process of managing a request transmitted from each terminal apparatus 3; the process of allowing the viewing of information based on the request; the process of managing a production content uploaded from each terminal apparatus 3; and the process of managing the popularity of the uploaded production content and allowing the viewing of the production content. The control section 202 also establishes communication links to the terminal apparatuses 3 and the like via the communication section 201, thereby controlling data transmission and selecting a path in the network 100. The storage section 203 stores: a program to be executed by the control section 202; various data necessary for the process of performing the above management and the process of allowing the above viewing; various data necessary for communication with the terminal apparatuses 3; and the like. It should be noted that, if the system requires a predetermined login process for data transmission/reception using the network 100, the system may perform an authentication process for determining whether or not a user attempting to log in to the server 200 is an authorized user. Further, the server 200 may be formed of a single server machine, or may be formed of a plurality of server machines.

Figure 4:
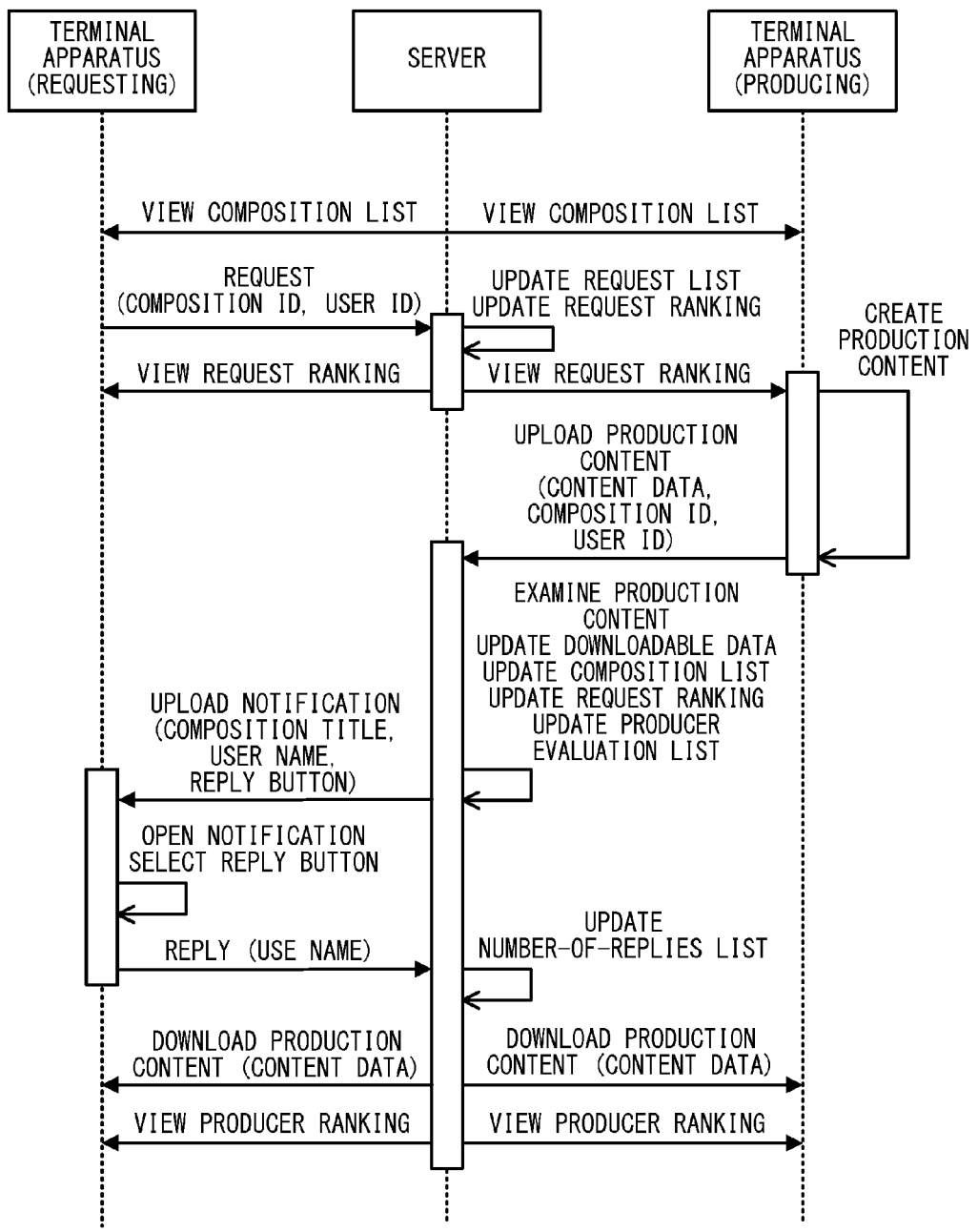
FIG. 4 is a chronological diagram showing a non-limiting example of the interactions between apparatuses in an information processing system 1.
Figure 5:
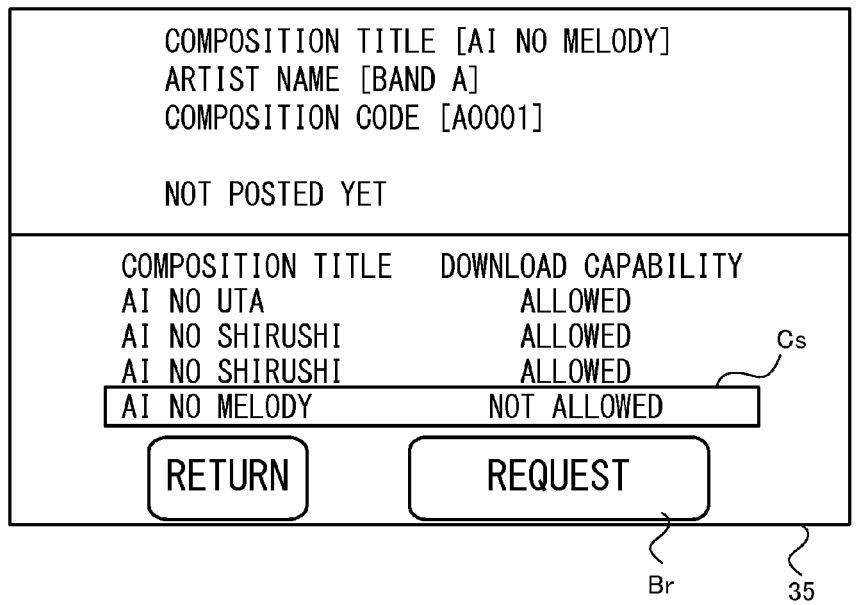
FIG. 5 is a diagram showing a non-limiting example of an image displayed on a display section 35 when a request is made from one of the terminal apparatuses 3.
Figure 6:
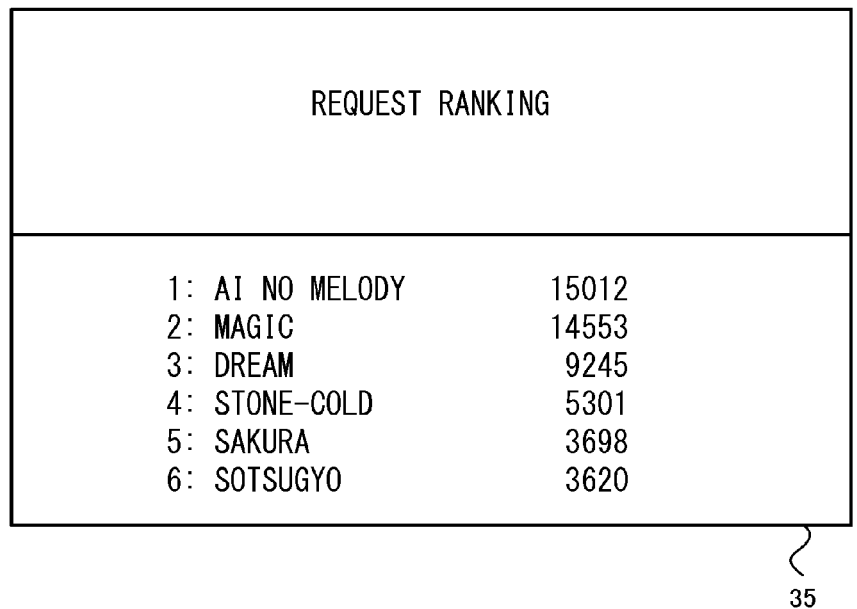
FIG. 6 is a diagram showing a non-limiting example of am image displayed on the display section 35 when a request ranking is viewed with the terminal apparatus 3.

Next, with reference to FIGS. 4 through 8, a description is given of an overview of the processing performed by the information processing system 1, before the description of specific processing performed by the terminal apparatuses 3 and the server 200. It should be noted that FIG. 4 is a chronological diagram showing an example of the interactions between apparatuses when a user requests the creation of a production content and the production content is uploaded in the information processing system 1. FIG. 5 is a diagram showing an example of an image displayed on the display section 35 when a request is made from one of the terminal apparatuses 3. FIG. 6 is a diagram showing an example of an image displayed on the display section 35 when a request ranking is viewed with the terminal apparatus 3. FIG. 7 is a diagram showing an example of an image in which a notification is displayed on the display section 35 when the requested production content has been uploaded. FIG. 8 is a diagram showing an example of an image displayed on the display section 35 when the production content is downloaded to the terminal apparatus 3. It should be noted that the following descriptions are given using a game (for example, a music game) as an example of the application to be executed by the plurality of terminal apparatuses 3. Alternatively, another application may be executed by the plurality of terminal apparatuses 3.

Each terminal apparatus 3 executes a predetermined application, and thereby can perform information processing using a content. The terminal apparatus 3 can also request, via the server 200, the user of another one of the terminal apparatuses 3 to create a content to be used in the information processing. The following descriptions are given using an example where the terminal apparatus 3 executes a predetermined game application, thereby performing a music game using a composition content, and executes the same game application, thereby enabling the request for the creation of a new composition content (a production content), the upload of the requested production content, the download of the uploaded production content, and a music game using the production content.

Referring to FIG. 4, when creating a production content or downloading a production content, the user of each terminal apparatus 3 views a composition list provided by the server 200. For example, when the user views the composition list, the terminal apparatus 3 transmits information requesting the viewing of the composition list to the server 200. Then, the server 200 transmits the composition list stored in the storage section 203 to the source of the viewing request.

For example, the composition list includes a list of a group of compositions allowed to be requested by the user and a list of a group of compositions of which production contents have already been uploaded. The composition list is managed in advance by the server 200. Here, a production content is obtained as follows. A composition is created as a result of a user, serving as a producer, using an already completed original composition as a material to alter it by arranging or editing it, or changing the lyrics thereof, so that the created composition is different from the original composition. Alternatively, a composition is obtained as a result of a user, serving as a producer, creating an original composition so as to be used as it is (in this case, the lyrics, the melody, the rhythm, or the like of the original composition may not be changed) in the above application (for example, a music game). Yet alternatively, a composition is obtained by copying an original composition as it is without altering it at all. In the composition list, if a production content has already been created and uploaded from its producer to the server 200, the composition used as a material for the production content is described so as to indicate that the production content is allowed to be downloaded. Meanwhile, in the composition list, an original composition of which a production content has not been created is also described so as to indicate that a production content of the original composition has not been created, and therefore, it is allowed to request the creation of a production content. It should be noted that the composition list describes a group of compositions in the state where: it is permitted to alter the compositions by, for example, arranging or editing them, or changing the lyrics thereof; it is permitted to disclose the altered compositions, the compositions created so as to be used in the application, and the compositions copied as they are from the originals; and it is permitted to use the compositions in the music game, all the permissions obtained in advance from the copyright holders or the people entrusted with the management of the copyrights by the copyright holders, such as copyright collecting societies.

Next, the user of the terminal apparatus 3 having made the viewing request views the received composition list, and selects a composition of which the creation of a production content the user is to request. For example, as shown in FIG. 5, on the display section 35 of the terminal apparatus 3 with which the user views the composition list, a plurality of composition titles are displayed together with the download capabilities of the compositions on the basis of the composition list transmitted from the server 200. Here, a composition described so as to indicate that the composition is allowed to be downloaded shows that a production content created using the composition as a material has already been uploaded, and therefore, the uploaded production content is allowed to be downloaded. On the other hand, a composition described so as to indicate that the composition is not allowed to be downloaded (the composition title "Ai No Melody" shown in FIG. 5) shows that a production content has not been created using the composition as a material, and therefore, it is allowed to request the creation of a production content using the composition as a material. In the example of FIG. 5, the composition title "Ai No Melody" of a composition, of which the creation of a production content is allowed to be requested, is selected from among the composition list with a selection cursor Cs. Then, information (the composition title, the artist name, and the composition code) regarding the selected composition is described in an upper region of the display section 35, while indicating that a production content has not been posted using the composition as a material. It should be noted that the user operates the input section 34, and thereby can move the selection cursor Cs or scroll the compositions displayed on the display section 35. It should be noted that the download capabilities in the composition list may be indicated to the user by other items of information. For example, it may be possible to determine the download capabilities on the basis of whether or not given parameters set for each production content (for example, the number of parts to be reproduced and the performance (play) time when play is performed using the production content in the music game, the level of difficulty of play, and the like) are displayed with the composition title. Further, the production content does not need to be uploaded and posted from each terminal apparatus 3 to the server 200. For example, if the system form of cloud computing described later is used, the server 200 performs a production process for altering or copying an original composition, or creating an original composition so as to be used in the application, in accordance with an operation using the terminal apparatus 3, and then stores the content resulting from the production process in the storage section 203.

On the display section 35, a request button Br is also displayed that receives a request instruction from the user. For example, the request button Br appears when the composition title of a composition allowed to be requested is being selected with the selection cursor Cs. Then, the user performs the operation of selecting the request button Br, thereby requesting, of the server 200, the creation of a production content using as a material the composition selected with the selection cursor Cs. For example, when the user makes a request, the terminal apparatus 3 transmits to the server 200 the composition title (the composition ID) of the composition for which the user has made the request, together with the user ID of the user having made the request. Here, the user ID may only need to be a unique code that enables the identification of the user, and may be, for example, an account ID, which is a character string serving as an indicator for the identification of the user.

In accordance with the requested composition and the user having made the request, the server 200 updates a request list and a request ranking. For example, the request list is a list for managing a requested composition (the composition ID) and the user having made the request (the user ID) with respect to each request, and is updated and stored in the storage section 203 with respect to each request. Further, the request ranking is a list for managing compositions by ranking them in accordance with the numbers of requests. For example, the request ranking ranks compositions in descending order of the number of requests, and is stored in the storage section 203.

When creating a production content, the user of each terminal apparatus 3, serving as a producer, can view the request ranking provided by the server 200, in order to know the compositions of which the creation of production contents is requested many times such that the compositions are used as materials. For example, when the user views the request ranking, the terminal apparatus 3 transmits information requesting the viewing of the request ranking to the server 200. Then, the server 200 transmits the request ranking stored in the storage section 203 to the source of the viewing request.

For example, as shown in FIG. 6, on the display section 35 of the terminal apparatus 3 with which the user views the request ranking, a composition ranking obtained by ranking compositions in descending order of, for example, the number of requests is displayed on the basis of the request ranking transmitted from the server 200. Here, the composition ranking indicates the numbers of requests for (the popularities of) compositions to be used as materials to create production contents. This enables the user, who creates a production content, to know the production contents needed by other users, by viewing the request ranking.

Next, the user of the terminal apparatus 3 having viewed the request ranking creates a production content with reference to the request ranking. Then, the user having created the production content can upload the created production content to the server 200 using the terminal apparatus 3. At this time, the user of the terminal apparatus 3, serving as a producer, uploads the production content in association with the composition used as a material to create the production content. For example, when the user uploads the production content, the terminal apparatus 3 transmits, to the server 200, data of the production content to be uploaded, together with the composition title (the composition ID) of the composition used as a material for the production content and the user name (the user ID) of the user who uploads the production content.

The uploaded production content is subjected to a predetermined examination so as to determine whether the production content passes or fails the examination. For example, the uploaded production content is subjected to an automatic examination and/or an examination by an administrator so as to determine: whether or not the composition associated with the production content when uploaded is used as a material in the scope of the permission obtained from the copyright holder or the like; whether or not the details of the content preserve public order and decency; whether the content can be used in the game application; and the like. Thus, it is determined whether the production content passes or fails the examination. Then, if the production content has passed the examination, the server 200 transmits, on the basis of the request list, an upload notification to all the users having requested the creation of the production content.

The terminal apparatus 3 having received the upload notification causes the received upload notification to be displayed on the display section 35 in accordance with the user performing the operation of opening the upload notification. For example, as shown in FIG. 7, on the display section 35 of the terminal apparatus 3 having opened the upload notification, email text based on the upload notification transmitted from the server 200 is displayed together with a "thank you" button Bt for thanking the user having created the production content. Then, the user performs the operation of selecting the "thank you" button Bt, thereby automatically returning a thank-you message to the server 200. As an example, in the upload notification, information for making an automatic reply so as to be linked to the server 200 is embedded in an image of the "thank you" button Bt displayed in the text of the notification. Then, the user selects the "thank you" button Bt so that the terminal apparatus 3 automatically transmits, to the server 200, information indicating the selection of the "thank you" button Bt, together with the user name of the user having selected the "thank you" button Bt in the upload notification (the user ID of the user having made the request) and the user name of the user having created the production content of which the notification has been made by the upload notification (the user ID having produced the production content).

The server 200 updates a number-of-replies list in accordance with the reply from the terminal apparatus 3 as a result of the selection of the "thank you" button Bt. For example, the number-of-replies list is a list for managing the number of thank-you messages returned to the producer (the user) with respect to each production content. The number-of-replies list is updated and stored in the storage section 203 with respect to each reply.

In addition, the production content having passed the examination is stored as downloadable data in the storage section 203 of the server 200. Further, in accordance with the addition of the production content having passed the examination to the downloadable data, the composition list and the request ranking are updated and stored in the storage section 203. For example, in the composition list, the composition associated with the production content added to the downloadable data (that is, the composition used as a material to create the production content) is changed so that the production content is allowed to be downloaded. Thus, every time the production content is downloaded, the number of downloads of the production content is incremented and updated. Further, the composition associated with the production content added to the downloadable data is erased from the request ranking, and the request ranking is updated.

Here, as described above, when downloading the production content, the user of the terminal apparatus 3 views the composition list provided by the server 200. Then, the user of the terminal apparatus 3 views the received composition list, thereby selecting the production content to be downloaded. For example, in the example of FIG. 8, the composition title "Ai No Melody" of a composition, of which a production content is allowed to be downloaded, is selected from among the composition list with the selection cursor Cs. Then, information (the composition title, the poster name, and the composition code) regarding the production content uploaded in association with the selected composition is described in the upper region of the display section 35, while indicating that the production content created using the composition as a material is allowed to be downloaded.

On the display section 35, a download button Bd is also displayed that receives a download instruction from the user. For example, the download button Bd appears when the composition title of a composition of which a production content is allowed to be downloaded is being selected with the selection cursor Cs. Then, the user performs the operation of selecting the download button Bd, thereby transmitting a download request to the server 200, and downloading from the server 200 the production content created using as a material the composition selected with the selection cursor Cs. Here, the user of the terminal apparatus 3 having downloaded the production content can perform, using the downloaded production content, information processing (for example, a music game) that is enabled by executing the application. That is, the user requests the creation of a production content and downloads the uploaded production content, and thereby can perform new information processing (for example, a music game) using a content that the user has not owned before.

In addition, in accordance with the fact that the production content has passed the examination, the server 200 updates a producer evaluation list. For example, the server 200 updates the producer evaluation list in accordance with the numbers of production contents that have been created by the respective producers and have passed the examination. For example, the producer evaluation list is a list for managing producers (users) by ranking them in accordance with the numbers of production contents that have been created by the respective producers and have passed the examination. The producer evaluation list is created by ranking users, for example, in descending order of the number of production contents having passed the examination, and is stored in the storage section 203. It should be noted that the producer evaluation list may be created on the basis of another evaluation parameter. For example, the producer evaluation list may be obtained by ranking users on the basis of at least one of: the numbers of production contents that have been created by the respective users and have passed the examination; the numbers of production contents uploaded by the respective users; and the numbers of automatic replies made to the upload notification described later (that is, the numbers of replies with thanks).

The user of the terminal apparatus 3 having created the production content can view a producer ranking provided by the server 200, in order to know the evaluations of the production content by other users. For example, when the user views the producer ranking, the terminal apparatus 3 transmits information requesting the viewing to the server 200. Then, on the basis of the producer evaluation list stored in the storage section 203, the server 200 transmits the producer ranking to the source of the viewing request. It should be noted that, when viewing the producer ranking, the user may be allowed to view also the number of returned thank-you messages with respect to each producer (user). For example, on the basis of the number-of-replies list stored in the storage section 203, the server 200 transmits, to the source of the viewing request, information indicating the number of returned thank-you messages with respect to each production content.

It should be noted that items of information (the composition list, the request list, the request ranking, the producer ranking, the number-of-replies list, and the like) may be viewed with the terminal apparatus 3 by various possible methods. For example, the items of information may be disclosed to the users of all the terminal apparatuses 3 accessible to the server 200, or may be disclosed only to the users of the terminal apparatuses 3 capable of logging in to the information processing system. Alternatively, only to the users concerned with information, the information may be directly transmitted. For example, in the case of the viewing of the producer ranking or the number-of-replies list, in response to the viewing request from the user of each terminal apparatus 3 capable of logging in to the information processing system, the user may be allowed to view only the rank of the user themselves in the producer ranking and only the number of replies to the user themselves. Further, if a change has been made in the ranks in the producer ranking or a change has been made in the number of replies, information may be directly transmitted only to the users concerned even if they have not made viewing requests.

In addition, the above descriptions are given using as examples of the production content: a content obtained as a result of a user, serving as a producer, using an already completed original composition as a material to alter it, so that the obtained composition is different from the original composition; a composition obtained as a result of a user, serving as a producer, creating an original composition so as to be used as it is (in this case, the lyrics, the melody, the rhythm, or the like of the original composition may not be changed); and the like. Alternatively, the production content may be a content in another form. For example, a material content to be used as a material for the production content may be a sound such as a conversation or a cry, a moving image, a still image, or the like. Further, the production content may be obtained not only by altering a material content, but also by using a different content created by combining a material content with another content. As an example, the production content may be a moving image content created by combining an already completed original composition (a material content) or a composition obtained by altering the material content, with a moving image prepared by a user. As another example, the production content may be a moving image content created by combining a moving image prepared as a material content, with a sound prepared by a user.

In addition, in the information processing system 1 described above, data is transmitted and received via the server 200. Alternatively, the server 200 may be formed of a single server machine, or may be formed of a plurality of server machines. If the server 200 is formed of a plurality of server machines, each server machine may share the functions described above. For example, a plurality of server machines may serve as the destinations of requests transmitted from the terminal apparatuses 3. In this case, to aggregate the transmitted requests, the requests aggregated by any of the server machines may be managed.

In addition, in the information processing using a content described above, each terminal apparatus 3 executes a predetermined application, and thereby can perform the processing described above. Thus, the mere execution of the predetermined application enables the user of the terminal apparatus 3 to use various functions described above. Further, the mere execution of the predetermined application using the terminal apparatus 3 makes it possible to promote the use of a series of processes including the data transmission/reception process and the information processing using a content. In this case, it is possible to designate a predetermined server as the destination of a request or an upload by the application, which can facilitate aggregating information. It should be noted that, if such effects are not desired, the application may be prepared separately for the terminal apparatus 3 of a user who makes a request, and for the terminal apparatus 3 of a user who produces a content. Then, the users may execute the respective applications in accordance with the roles of their terminal apparatuses 3, and thereby can perform the processing described above.

In addition, in the processing described above, the terminal apparatus 3 with which the user makes a request transmits the request to the server 200, together with information indicating the user having made the request. However, in the state of the request on the basis of which the server 200 allows the viewing, information indicating the user having made the request is not presented. This makes it possible to maintain the anonymity of the user having made the request. Further, the request is not made for a specific user but made for unspecified users. This provides an environment where it is very easy for the user of the terminal apparatus 3 to make a request. Meanwhile, if the requested production content has been uploaded, an upload notification is transmitted to all the users themselves having requested the production content. This enables the establishment of an unconventional data transmission/reception system as follows. Each user can receive a notification such that the request is answered while the user remains anonymous to the destination of the request, and further, the user can return thanks to the destination of the request. It should be noted that, if such effects are not desired, in the state of the request on the basis of which the server 200 allows the viewing, information indicating the user having made the request may also be presented. Alternatively, thanks (a thank-you message) may be directly transmitted to the poster so as to notify them of information regarding the user having made the request.

Figure 9:
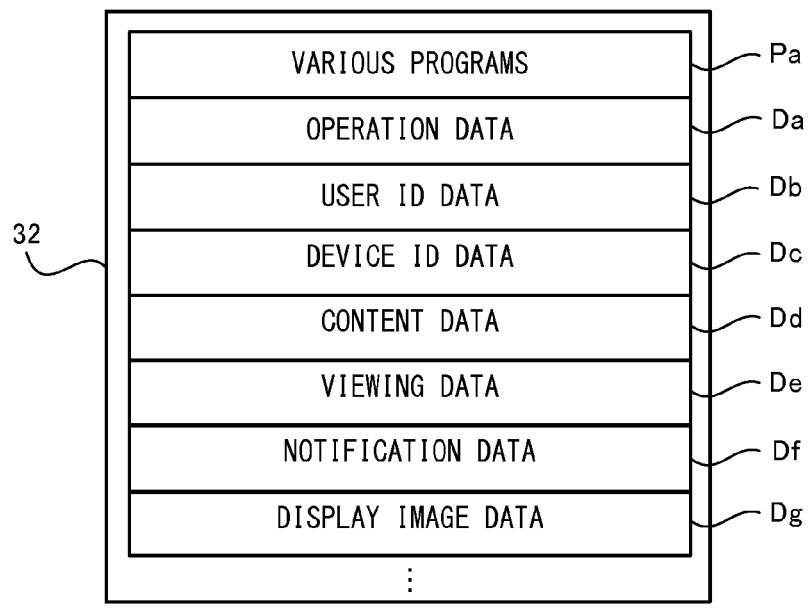
FIG. 9 is a diagram showing non-limiting examples of main data and programs stored in a storage section 32 of each terminal apparatus 3.
Figure 10:
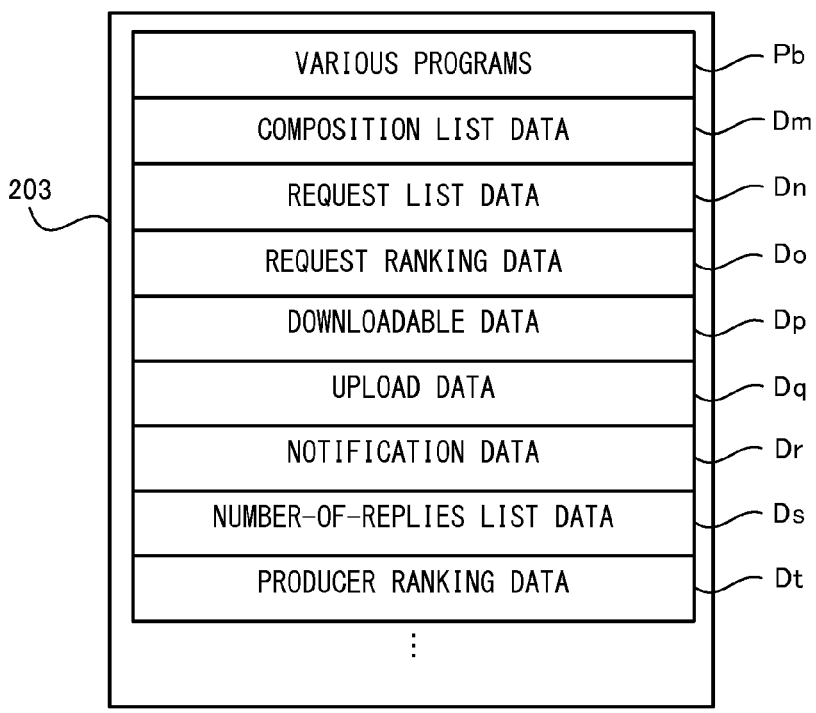
FIG. 10 is a diagram showing non-limiting examples of main data and programs stored in a storage section 203 of the server 200.

Next, a detailed description is given of the processing performed by the information processing system 1. First, with reference to FIGS. 9 through 11, main data used in the processing is described. It should be noted that FIG. 9 is a diagram showing examples of main data and programs stored in the storage section 32 of each terminal apparatus 3. FIG. 10 is a diagram showing examples of main data and programs stored in the storage section 203 of the server 200. FIG. 11 is a diagram showing an example of request list data Dn stored in the storage section 203.

As shown in FIG. 9, the following are stored in the data storage area of the storage section 32: operation data Da; user ID data Db; device ID data Dc; content data Dd; viewing data De; notification data Df; display image data Dg; and the like. It should be noted that the storage section 32 stores, as well as the data included in the information shown in FIG. 9, data and the like necessary for the processing, such as data used in an application to be executed. Further, in the program storage area of the storage section 32, various programs Pa included in the information processing program are stored.

The operation data Da is data representing operation information of the operation performed on the terminal apparatus 3 by the user. For example, operation data indicating the operation performed on an operation button or the like is acquired per time unit that the terminal apparatus 3 performs processing (for example, every 1/60 second), and the operation data is stored and updated in the operation data Da in accordance with the acquisition.

The user ID data Db is data representing a unique code (a user ID) that enables the identification of the user who uses the terminal apparatus 3, and is data representing, for example, an account ID, which is a character string serving as an indicator for the identification of the user.

The device ID data Dc is data representing a unique code (a device ID) that enables the identification of the terminal apparatus 3, and is data representing, for example, an unalterable character string serving as an indicator for the identification of the device. The device ID data Dc stores the device ID set in advance for the terminal apparatus 3.

The content data Dd is data representing a content used by the terminal apparatus 3 for information processing such as a game application, and includes data representing a production content as described above obtained by downloading it from the server 200. Further, if an original composition content to be used as a material for a production content can be used in the information processing, the content data Dd includes data representing the composition content.

The viewing data De is data to be viewed, provided by the server 200, and includes, for example, data representing information indicating the composition list, the request list, the request ranking, the producer ranking, the number-of-replies list, and the like transmitted from the server 200.

The notification data Df is data stored when an upload notification has been transmitted from the server 200, and includes data for displaying the upload notification, data for returning a thank-you message, flag data representing the setting of the "thank you" button Bt, and the like.

The display image data Dg is data for generating an image in which an object, a character, a background, and the like are placed, and displaying the image on the display section 35.

As shown in FIG. 10, the following are stored in the data storage area of the storage section 203: composition list data Dm; request list data Dn; request ranking data Do; downloadable data Dp; upload data Dq; notification data Dr; number-of-replies list data Ds; producer ranking data Dt; and the like. It should be noted that the storage section 203 may store, as well as the data included in the information shown in FIG. 10, data and the like necessary for the processing performed by the server 200 (for example, a process regarding a login). Further, in the program storage area of the storage section 203, various programs Pb for achieving the above processing are stored.

The composition list data Dm is data representing a list of a group of compositions allowed to be requested by the user and a list of a group of compositions of which production contents have already been uploaded. Typically, the composition list data Dm represents a group of compositions on the basis of those in the state where it is permitted to, for example, alter or disclose contents, and use contents in the game application, all the permissions obtained in advance from the copyright holders. The composition list data Dm is updated as needed in accordance with the addition of a composition to the compositions, the deletion of a composition from the compositions, or a change in the compositions, and the addition of a production content.

As shown in FIG. 11, the request list data Dn is data for managing a requested composition and the user having made the request, with respect to each request. For example, the request list data Dn manages the requested composition and the user, using the user ID and the device ID as data representing the user having made the request, and using the composition ID as data representing the composition requested by the user.

The request ranking data Do is data ranking compositions in accordance with the numbers of requests.

The downloadable data Dp is content data of a production content allowed to be downloaded. The upload data Dq is content data of a production content uploaded by a user and data representing the composition associated with the production content.

The notification data Dr is data for transmitting an upload notification to all the users having made requests. The number-of-replies list data Ds is data representing the number-of-replies list indicating the number of thank-you messages returned from the terminal apparatuses 3, with respect to each poster.

The producer ranking data Dt is data representing the numbers of production contents that have been created by the respective producers and have passed the examination, and is data ranking the numbers of production contents created by the respective producers and managing the ranking.

Figure 12:
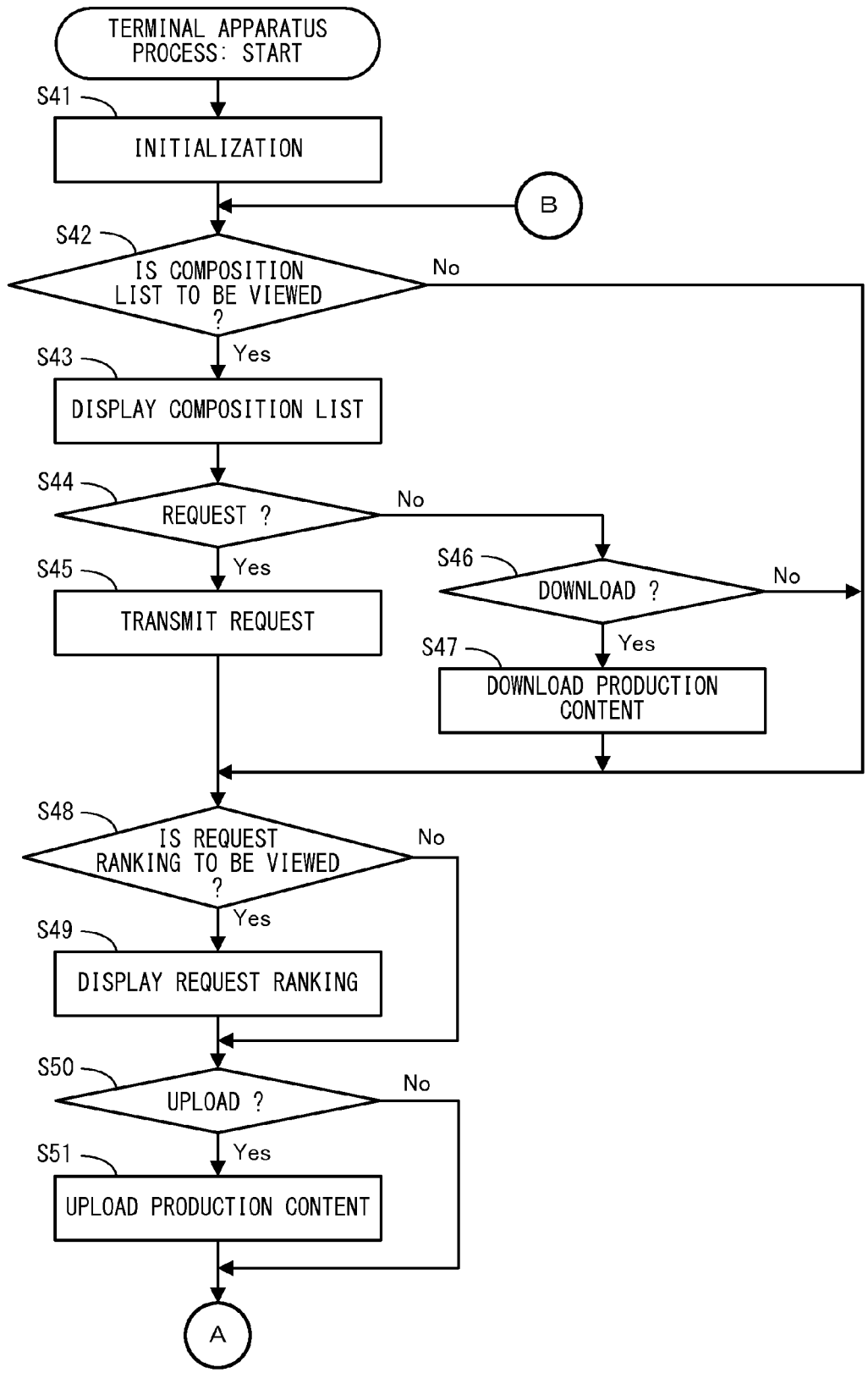
FIG. 12 is a flow chart showing a non-limiting example of the first half of the processing performed by each terminal apparatus 3.
Figure 13:
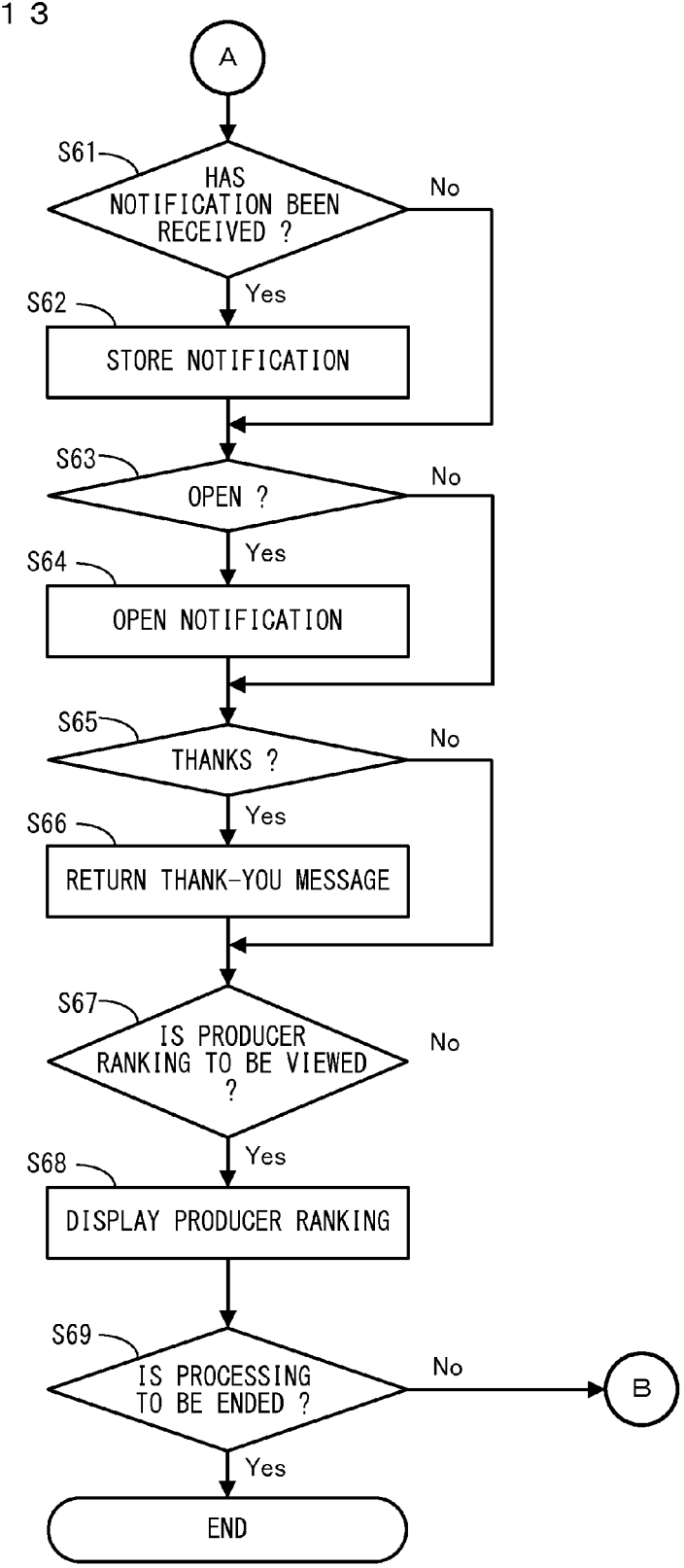
FIG. 13 is a flow chart showing a non-limiting example of the second half of the processing performed by the terminal apparatus 3.
Figure 14:
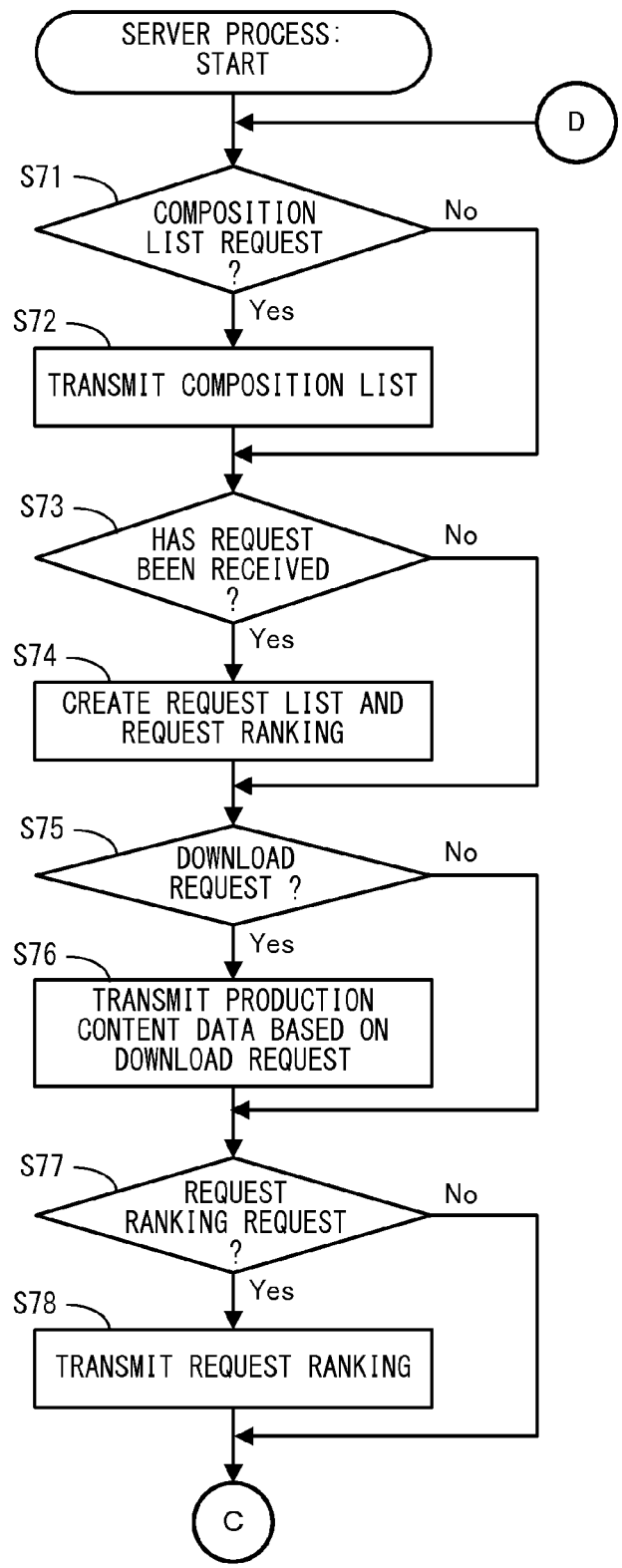
FIG. 14 is a flow chart showing a non-limiting example of the first half of the processing performed by the server 200.
Figure 15:
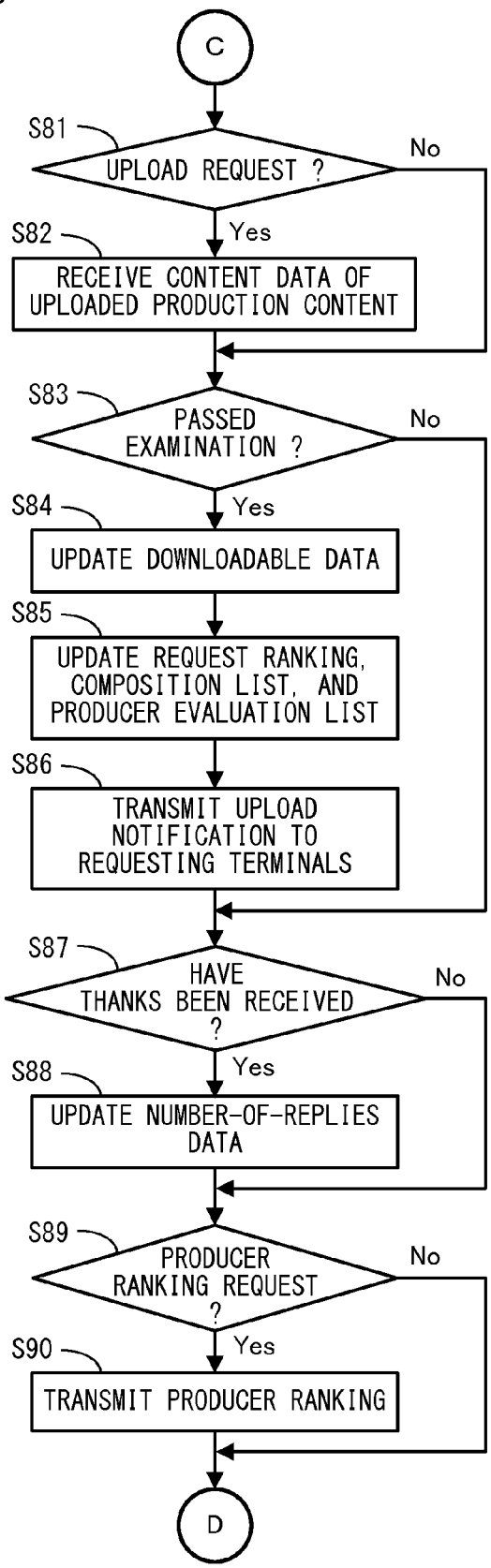
FIG. 15 is a flow chart showing a non-limiting example of the second half of the processing performed by the server 200.

Next, with reference to FIGS. 12 through 15, detailed descriptions are given of the processing performed by each terminal apparatus 3 and the server 200. It should be noted that FIGS. 12 and 13 are flow charts showing an example of the processing performed by the terminal apparatus 3. FIGS. 14 and 15 are flow charts showing an example of the processing performed by the server 200. Here, in the flow charts shown in FIGS. 12 through 15, descriptions are given mainly of, in the processing performed by the information processing system 1, the processes from the request for a production content to the evaluation of a producer. Detailed descriptions of other processes not directly related to these processes are omitted. Further, in FIGS. 12 through 15, all the steps performed by the control section 31 and the control section 202 are abbreviated as "S".

It should be noted that the processes of all the steps in the flow chart shown in FIGS. 12 through 15 are merely illustrative. Thus, the processing order of the steps may be changed, or another process may be performed in addition to the processes of all the steps, so long as similar results are obtained. Further, in the exemplary embodiment, descriptions are given on the assumption that the control section 31 (the CPU) or the control section 202 (the CPU) performs the processes of all the steps in the flow chart. Alternatively, a processor or a dedicated circuit other than the CPU may perform the processes of some or all of the steps in the flow chart.

First, a description is given of the processing performed by the terminal apparatus 3. The CPU of the control section 31 initializes a memory and the like of the storage section 32, and loads the information processing program from the program storage section 33 into the memory. Then, the CPU starts the execution of the information processing program. The flow charts shown in FIGS. 12 and 13 are flow charts showing the processing performed after the above processes are completed.

Referring to FIG. 12, the control section 31 performs initialization (step 41), and proceeds to the subsequent step. For example, the control section 31 initializes a game application that enables a series of processes from the request for a production content to the evaluation of a producer, the process of performing a game (for example, a music game) using the downloaded production content, and the like. For example, in the initialization, the control section 31 initializes other parameters in order to perform the following information processing. Further, the control section 31 performs the process of logging in to the network 100. For example, the control section 31 performs the process of logging in to the network 100 using the user ID represented by the user ID data Db and the device ID represented by the device ID data Dc. An authentication server (for example, the server 200) connected to the network 100 authenticates the account using the user ID and the device ID transmitted in the login process, and sends the authentication result to the transmission source (the terminal apparatus 3).

Next, the control section 31 determines whether or not the composition list is to be viewed (step 42). For example, with reference to the operation data Da, if the user has performed the operation of viewing the composition list, using the input section 34, the control section 31 determines that the composition list is to be viewed. Then, if the composition list is to be viewed, the control section 31 proceeds to step 43. If, on the other hand, the composition list is not to be viewed, the control section 31 proceeds to step 48.

In step 43, the control section 31 causes the composition list to be displayed on the display section 35, and proceeds to the subsequent step. For example, the control section 31 transmits information requesting the viewing of the composition list to the server 200, acquires data representing the composition list from the server 200, and updates the viewing data De. Then, the control section 31 causes at least part of the composition list represented by the viewing data De to be displayed on the display section 35 (see FIGS. 5 and 8).

Next, the control section 31 determines whether or not a request is to be made (step 44). For example, with reference to the operation data Da, if the user has performed the operation of making a request (for example, the operation of selecting the request button Br exemplified in FIG. 5), the control section 31 determines that a request is to be made. Then, if a request is to be made, the control section 31 proceeds to step 45. If, on the other hand, a request is not to be made, the control section 31 proceeds to step 46.

In step 45, the control section 31 transmits the request to the server 200, and proceeds to step 48. For example, to request the creation of a production content using as a material the composition selected when the operation of making the request has been performed (for example, the composition selected with the selection cursor Cs exemplified by the FIG. 5), the control section 31 transmits the composition ID of the selected composition and the user ID represented by the user ID data Db to the server 200.

In step 46, on the other hand, the control section 31 determines whether or not a download is to be performed. For example, with reference to the operation data Da, if the user has performed the operation of performing a download (for example, the operation of selecting the download button Bd exemplified in FIG. 8), the control section 31 determines that a download is to be performed. Then, if a download is to be performed, the control section 31 proceeds to step 47. If, on the other hand, a download is not to be performed, the control section 31 proceeds to step 48.

In step 47, the control section 31 transmits a download request to the server 200, stores downloaded content data in the storage section 32, and proceeds to step 48. For example, to download a production content created using as a material the composition selected when the operation of performing the download has been performed (for example, the composition selected with the selection cursor Cs exemplified in FIG. 8), the control section 31 transmits the composition ID of the selected composition and the user ID represented by the user ID data Db to the server 200. Then, the control section 31 stores, as the content data Dd, content data of the production content downloaded from the server 200.

In step 48, the control section 31 determines whether or not the request ranking is to be viewed. For example, with reference to the operation data Da, if the user has performed the operation of viewing the request ranking, using the input section 34, the control section 31 determines that the request ranking is to be viewed. Then, if the request ranking is to be viewed, the control section 31 proceeds to step 49. If, on the other hand, the request ranking is not to be viewed, the control section 31 proceeds to step 50.

In step 49, the control section 31 causes the request ranking to be displayed on the display section 35, and proceeds to step 50. For example, the control section 31 transmits information requesting the viewing of the request ranking to the server 200, acquires data representing the request ranking from the server 200, and stores the acquired data as the viewing data De. Then, the control section 31 causes at least part of the request ranking represented by the viewing data De to be displayed on the display section 35 (see FIG. 6).

In step 50, the control section 31 determines whether or not an upload is to be performed. For example, with reference to the operation data Da, if the user has performed the operation of uploading a production content, the control section 31 determines that an upload is to be performed. Then, if an upload is to be performed, the control section 31 proceeds to step 51. If, on the other hand, an upload is not to be performed, the control section 31 proceeds to step 61 (see FIG. 13).

In step 51, the control section 31 uploads the production content, and proceeds to step 61 (see FIG. 13). Here, as described above, the user who performs the upload associates the production content with the composition used as a material to create the production content, and uploads the production content. For example, the control section 31 transmits, to the server 200, content data of the production content to be uploaded, the composition ID of the composition used as a material for the production content, and the user ID represented by the user ID data Db.

Referring next to FIG. 13, the control section 31 determines whether or not the control section 31 has received an upload notification (step 61). Then, if the control section 31 has received an upload notification, the control section 31 proceeds to step 62. If, on the other hand, the control section 31 has not received an upload notification, the control section 31 proceeds to step 63.

In step 62, the control section 31 stores the received upload notification as the notification data Df, and proceeds to step 63. It should be noted that the flag data representing the setting of the "thank you" button Bt in the notification data Df is initialized so as to set the "thank you" button Bt to the on state (the state of being capable of being selected) for the stored upload notification.

In step 63, the control section 31 determines whether or not the upload notification is to be opened and displayed. For example, with reference to the operation data Da, if the user has performed the operation of opening the upload notification, the control section 31 determines that the upload notification is to be opened. Then, if the upload notification is to be opened, the control section 31 proceeds to step 64. If, on the other hand, the upload notification is not to be opened, the control section 31 proceeds to step 65.

In step 64, the control section 31 opens the upload notification, causes the open upload notification to be displayed on the display section 35, and proceeds to step 65. For example, the control section 31 causes the upload notification represented by the notification data Df to be displayed on the display section 35 (see FIG. 7), thereby opening the upload notification. It should be noted that the "thank you" button Bt displayed in the text of the upload notification is set to the on state or the off state (the state of being capable of being selected or the state of being incapable of being selected) when displayed, in accordance with the flag data set as the notification data Df.

In step 65, the control section 31 determines whether or not thanks are to be returned to the poster having uploaded the production content. For example, with reference to the operation data Da, if the user has performed the operation of returning thanks (for example, the operation of selecting the "thank you" button Bt exemplified in FIG. 7), the control section 31 determines that thanks are to be returned. Then, if thanks are to be returned, the control section 31 proceeds to step 66. If, on the other hand, thanks are not to be returned, the control section 31 proceeds to step 67.

In step 66, the control section 31 returns a thank-you message to the poster having created the production content of which the notification has been made in the currently open upload notification, and proceeds to step 67. For example, on the basis of reply information defined in the upload notification (for example, automatic reply information embedded in an image of the "thank you" button Bt exemplified in FIG. 7), the control section 31 transmits, to the server 200, data representing the poster (the user ID) together with a predetermined reply message (a thank-you message). Then, the control section 31 updates the flag data representing the setting of the "thank you" button Bt in the notification data Df, so as to set the "thank you" button Bt to the off state (the state of being incapable of being selected) for the upload notification.

In step 67, the control section 31 determines whether or not the producer ranking is to be viewed. For example, with reference to the operation data Da, if the user has performed the operation of viewing the producer ranking, using the input section 34, the control section 31 determines that the producer ranking is to be viewed. Then, if the producer ranking is to be viewed, the control section 31 proceeds to step 68. If, on the other hand, the producer ranking is not to be viewed, the control section 31 proceeds to the above step 69.

In step 68, the control section 31 causes the producer ranking to be displayed on the display section 35, and proceeds to step 69. For example, the control section 31 transmits information requesting the viewing of the producer ranking to the server 200, acquires data representing the producer ranking from the server 200, and stores the acquired data as the viewing data De. Then, the control section 31 causes at least part of the producer ranking represented by the viewing data De to be displayed on the display section 35. It should be noted that the data transmitted from the server 200 includes data representing the number of returned thank-you messages (the number-of-replies list) with respect to each producer. Thus, by performing the operation of selecting a producer from among the producer ranking displayed on the display section 35, it is also possible to view the number of replies to the selected producer (for example, a breakdown of the number of replies with respect to each production content uploaded by the producer).

In step 69, the control section 31 determines whether or not the processing is to be ended. Examples of conditions for ending the processing include: the satisfaction of the condition under which the processing is ended; the fact that the user has performed the operation of ending the processing; and the like. If the processing is not to be ended, the control section 31 returns to the above step 42, and repeats the process thereof. If the processing is to be ended, the control section 31 ends the processing indicated in the flow charts.

Next, a description is given of the processing performed by the server 200. Referring to FIG. 14, the control section 202 of the server 200 determines whether or not the control section 202 has received a composition list request from any one of the terminal apparatuses 3 (step 71). Then, if the control section 202 has received a composition list request, the control section 202 proceeds to step 72. If, on the other hand, the control section 202 has not received a composition list request, the control section 202 proceeds to the subsequent step 73.

In step 72, the control section 202 performs the process of transmitting the composition list to the terminal apparatus 3 having requested the composition list, and proceeds to step 73. For example, the control section 202 transmits the composition list represented by the composition list data Dm to the terminal apparatus 3 of the request source.

In step 73, the control section 202 determines whether or not the control section 202 has received a request. Then, if the control section 202 has received a request, the control section 202 proceeds to step 74. If, on the other hand, the control section 202 has not received a request, the control section 202 proceeds to step 75.

In step 74, the control section 202 creates (updates) the request list and the request ranking, and proceeds to step 75. For example, the control section 202 adds information regarding the received request (the requested composition (the composition ID), the user having made the request (the user ID and the device ID), and the like) to the request list, and updates the request list data Dn. Further, the control section 202 increments the number of requests in the request ranking for the composition of which the creation of a production content has been requested by the received request, and updates the request ranking data Do.

In step 75, the control section 202 determines whether or not the control section 202 has received a download request from any one of the terminal apparatuses 3. Then, if the control section 202 has received a download request, the control section 202 proceeds to step 76. If, on the other hand, the control section 202 has not received a download request, the control section 202 proceeds to step 77.

In step 76, the control section 202 performs the process of transmitting content data requested by the terminal apparatus 3 having requested the download, and proceeds to step 77. For example, the control section 202 extracts, from the downloadable data Dp, content data of the production content for which the download request has been made, and transmits the content data to the terminal apparatus 3 of the request source.

In step 77, the control section 202 determines whether or not the control section 202 has received a request ranking request from any one of the terminal apparatuses 3. Then, if the control section 202 has received a request ranking request, the control section 202 proceeds to step 78. If, on the other hand, the control section 202 has not received a request ranking request, the control section 202 proceeds to step 81 (see FIG. 15).

In step 78, the control section 202 performs the process of transmitting the request ranking to the terminal apparatus 3 having requested the request ranking, and proceeds to step 81 (see FIG. 15). For example, the control section 202 transmits the request ranking represented by the request ranking data Do to the terminal apparatus 3 of the request source.

Referring next to FIG. 15, in step 81, the control section 202 determines whether or not the control section 202 has received an upload request from any one of the terminal apparatuses 3. Then, if the control section 202 has received an upload request, the control section 202 proceeds to step 82. If, on the other hand, the control section 202 has not received an upload request, the control section 202 proceeds to step 83.

In step 82, the control section 202 performs the process of receiving content data of a production content uploaded from any one of the terminal apparatuses 3, and proceeds to step 83. For example, the control section 202 stores, as the upload data Dq, content data of a production content uploaded from any one of the terminal apparatuses 3, the composition ID of the composition used as a material for the production content, and the user ID represented by the user ID data Db.

In step 83, the control section 202 determines whether or not the uploaded production content has passed a predetermined examination. For example, the control section 202 or an administrator of the server 200 determines whether or not the uploaded production content has passed the examination, by examining: whether or not the composition associated with the production content when uploaded is used as a material; whether or not the details of the content preserve public order and decency; whether or not the content can be used in the game application; and the like. Then, if the production content has passed the predetermined examination, the control section 202 proceeds to step 84. If, on the other hand, the production content has not passed the predetermined examination, or the result of the examination of the production content has not been obtained, the control section 202 proceeds to step 87.

In step 84, the control section 202 adds the production content having passed the examination to the downloadable data Dp, updates the downloadable data Dp, and proceeds to the subsequent step. For example, the control section 202 adds, as a production content corresponding to the composition associated with the production content when uploaded, the content data of the production content to the downloadable data Dp, and updates the downloadable data Dp.

Next, the control section 202 updates the request ranking, the composition list, and the producer evaluation list (step 85), and proceeds to the subsequent step. For example, the control section 202 deletes from the request ranking the composition associated with the production content having passed the examination, and updates the request ranking data Do. Further, the control section 202 changes the setting of the composition associated with the production content having the passed the examination to the setting that allows the production content to be downloaded, and then, the control section 202 updates the composition list data Dm. Furthermore, the control section 202 increments the number of production contents having passed the examination, with respect to the user having uploaded the production content having passed the examination, and updates the producer ranking data Dt.

Next, the control section 202 transmits an upload notification to the users having requested the creation of the production content having passed the examination (step 86), and proceeds to step 87. For example, on the basis of the request list data Dn, the control section 202 extracts information regarding all the users having requested the creation of the production content having passed the examination. Then, on the basis of the extracted information and the notification data Dr, the control section 202 transmits an upload notification to all the users.

In step 87, the control section 202 determines whether or not the control section 202 has received a thank-you message expressing thanks from any one of the terminal apparatuses 3. Then, if the control section 202 has received a thank-you message, the control section 202 proceeds to step 88. If, on the other hand, the control section 202 has not received a thank-you message, the control section 202 proceeds to step 89.

In step 88, the control section 202 updates the number-of-replies list, and proceeds to step 89. For example, the control section 202 increments the number of replies to the target of thanks (the poster) in the received thank-you message, and updates the number-of-replies list data Ds.

In step 89, the control section 202 determines whether or not the control section 202 has received a producer ranking request from any one of the terminal apparatuses 3. Then, if the control section 202 has received a producer ranking request, the control section 202 proceeds to step 90. If, on the other hand, the control section 202 has not received a producer ranking request, the control section 202 returns to the above step 71, and repeats the process thereof.

In step 90, the control section 202 performs the process of transmitting the producer ranking to the terminal apparatus 3 having requested the producer ranking, returns to the above step 71, and repeats the process thereof. For example, the control section 202 transmits the producer ranking represented by the producer ranking data Dt to the terminal apparatus 3 of the request source.

As described above, in the information processing system 1, the user selects a material content from among a plurality of material contents (compositions), and thereby can request another user to create a production content using the selected material content as a material. Then, the state of the request from the user is presented to the other user serving as a producer who creates the production content. This enables the creation of a production content as a result of the user themselves narrowing down elements to be used for the production content.

It should be noted that the above descriptions are given using the example where the user selects a composition from among a plurality of compositions (material contents) to be used as a material to create a production content, thereby requesting the user of another one of the terminal apparatuses 3 to create a production content associated with the selected composition. Alternatively, it may be possible to make such a request by selecting another element. For example, the user may select a genre (for example, a music genre such as "J-Pop") in which the creation of a production content the user is to request, thereby presenting the number of requests with respect to the genre to the user serving as a producer.

In addition, the above descriptions are given using the example where each terminal apparatus 3 and the server 200 perform the information processing. Alternatively, another apparatus may perform at least some of the processing steps in the information processing. For example, if the terminal apparatus 3 is further configured to communicate with another apparatus (for example, another server, another game apparatus, or another mobile terminal), the other apparatus may cooperate to perform the processing steps of the information processing. As an example, the other apparatus may perform the information processing using a content (for example, generate a virtual world in the game processing and perform the game processing using the virtual world), and the result of the game processing may be displayed on the display section 35 of the terminal apparatus 3. Alternatively, the terminal apparatus 3 or another apparatus may perform some of the processing performed by the server 200. Another apparatus may thus perform at least some of the processing steps in the information processing, which enables information processing similar to that described above. Further, the information processing described above can be performed by a processor or the cooperation of a plurality of processors, the processor and the plurality of processors contained in an information processing system including at least one information processing apparatus and a server. Further, in the exemplary embodiment, the processing indicated in the flow charts described above is performed as a result of the control section 31 of the terminal apparatus 3 and the control section 202 of the server 200 executing a predetermined program. Alternatively, some or all of the processing indicated in the flow charts may be performed by a dedicated circuit included in the terminal apparatus 3 and a dedicated circuit included in the server 200.

Here, the above variations make it possible to achieve the exemplary embodiment also by a system form such as cloud computing, or a system form such as a distributed wide area network or a local area network. In this case, each content described above is saved as a cloud-based content in a server machine such as the server 200 so that each terminal apparatus 3 can use the content without downloading or uploading it. Further, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step described above. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the information processing program (game program) may be supplied to each terminal apparatus 3 and the server 200 not only through an external storage medium such as the external memory 45, but also through a wired or wireless communication link. Further, the program may be stored in advance in a non-volatile storage device included in the terminal apparatus 3 and the server 200. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

An information processing system, an information processing apparatus, a server, a storage medium having stored therein an information processing program, and an information processing method according to the exemplary embodiment enable the creation of a content expected by another user, and are useful as an information processing system, an information processing apparatus, a server, an information processing program, an information processing method, and the like in which a plurality of apparatuses transmit and receive predetermined data to and from each other.

What is claimed is:

1. An information processing system including at least one server and a plurality of terminal apparatuses, the information processing system comprising:
    a production content storage control unit configured to store a production content in a storage unit of the server in accordance with an operation on each terminal apparatus;
    a selection unit configured to allow each of the terminal apparatuses to select a material content from among a plurality of material contents so that the selected material content is used as a material to create the production content;
    a request unit configured to make requests from a plurality of terminal apparatuses to the server for creation of a production content associated with the selected material content; and a state presentation unit configured to present a state of each of the requests to the plurality of terminal apparatuses from which the requests are made and to other terminal apparatuses.

2. The information processing system according to claim 1, further comprising
a material content setting unit configured to set, at least from among the plurality of material contents for which the request is allowed to be made, a material content to be associated with the production content to be stored in the storage unit, wherein
when storing the production content in the storage unit, the production content storage control unit stores the production content together with data representing the material content set in association with the production content.

3. The information processing system according to claim 1, further comprising
a production content creation unit configured to, in accordance with an operation on a terminal apparatus, create the production content using as a material a material content selected from among the plurality of material contents for which the request is allowed to be made.

4. The information processing system according to claim 1, wherein
on the basis of a first application, the request unit makes requests for creation of a production content to be used in predetermined information processing; and
the information processing system further comprises an information processing unit configured to perform the information processing using the production content on the basis of the first application.

5. The information processing system according to claim 4, further comprising:
a viewing unit configured to allow viewing of the state of the requests by each terminal apparatus in the plurality of terminal apparatuses from which the requests are made and by the other terminal apparatuses on the basis of the first application; and
a production content creation unit configured to create the production content by at least one terminal apparatus on the basis of the first application, wherein
on the basis of the first application, the production content storage control unit stores the production content created by the production content creation unit in the storage unit.

6. The information processing system according to claim 1, further comprising:
a viewing unit configured to allow viewing of the state of the requests by each terminal apparatus in the plurality of terminal apparatuses from which the requests are made and by the other terminal apparatuses on the basis of a second application; and
a production content creation unit configured to create the production content by at least one terminal apparatus on the basis of the second application, wherein
on the basis of the second application, the production content storage control unit stores the production content created by the production content creation unit in the storage unit.

7. The information processing system according to claim 4, wherein
the request unit sets as a destination of the requests a predetermined server determined by the first application.

8. The information processing system according to claim 1, wherein the state presentation unit includes a request management unit configured to aggregate and manage all the requests; and
using the requests aggregated by the request management unit, the state presentation unit presents a result of adding up the requests to the plurality of terminal apparatuses from which the requests are made and to other terminal apparatuses.

9. The information processing system according to claim 1, further comprising:
a requesting user list storage unit configured to store a requesting user list for managing the material content indicated by the request and a user having made the request; and
a notification unit configured to, if the production content has been stored in the storage unit, notify, on the basis of the requesting user list, all the users having requested creation of the production content that the production content has been stored in the storage unit.

10. The information processing system according to claim 1, further comprising:
a notification unit configured to, if the production content has been stored in the storage unit, notify a user having requested creation of the production content of data representing a user having created the production content, and also notify the user having requested creation of the production content that the production content has been stored in the storage unit; and
a reply unit configured to, on the basis of the data representing the user of which the notification has been made, send or present predetermined data to the user having created the production content of which the notification has been made.

11. The information processing system according to claim 1, wherein
the state presentation unit presents the state of the requests to the plurality of terminal apparatuses from which the requests are made and to other terminal apparatuses without presenting information enabling identification of a user having made the request.

12. An information processing apparatus capable of communicating with at least one server,
the server comprising a production content storage control unit configured to store a production content in a storage unit of the server in accordance with operations of a plurality of terminal apparatuses capable of communicating with the server,
the information processing apparatus comprising a processing system including at least one processor and being configured to:
select a material content from among a plurality of material contents so that the selected material content is used as a material to create the production content;
make a request to the server for creation of a production content associated with the selected material content, so that the server presents a state of the request to the plurality of terminal apparatuses; and
receive, from the server, a presentation of a state for each request from a plurality of other requests, received by the server from the plurality of terminal apparatuses, for creation of a production content associated with a selected material content.

13. A server comprising a processing system, including at least one processor, the processing system being configured to:
store a production content in a storage unit in accordance with an operation on each terminal apparatus;

acquire data, from a plurality of terminal apparatuses having made requests, with which each terminal apparatus selects a material content from among a plurality of material contents to be used as materials to create the production content and thereby requests a user of another terminal apparatus to create a production content associated with the selected material content; and present a state of each of the requests to a plurality of terminal apparatuses from which the requests are made and to other terminal apparatuses, wherein a content created using as a material the material content selected from among the plurality of material contents for which the request is allowed to be made is stored as the production content in the storage unit.

14. An information processing apparatus capable of communicating with at least one server, the server comprising at least one processor and being configured to store a production content in a storage unit of the server, the information processing apparatus comprising at least one processor and being configured to:

make a request to the server for creation of a production content associated with material content selected from a plurality of material contents to be used as materials to create the production content;

after a material content has been selected from among the plurality of material contents to be used as materials to create the production content and requests have been made from other apparatuses for creation of production content associated with the selected material content via the server, acquire, from the server, a state of the requests made by the other apparatuses and present the state of the requests; and in accordance with an operation, set, at least from among the plurality of material contents for which the requests are allowed to be made, a material content to be associated with the production content to be stored in the storage unit, and store the production content together with data representing the material content in the storage unit of the server.

15. A non-transitory computer-readable storage medium having stored therein an information processing program to be executed by a computer of an information processing system including at least one server and a plurality of terminal apparatuses, the server comprising a production content storage control unit configured to store a production content in a storage unit of the server in accordance with an operation on each terminal apparatus, the information processing program, when executed, causing the computer to perform operations comprising:

allowing a material content to be selected from among a plurality of material contents so that the selected material content is used as a material to create the production content;

making a request to the server for creation of a production content associated with the selected material content, so that the server presents a state of the request to the plurality of terminal apparatuses; and receiving, from the server, a presentation of a state for each request from a plurality of other requests, received by the server from the plurality of terminal apparatuses, for creation of a production content associated with a selected material content.

16. A non-transitory computer-readable storage medium having stored therein an information processing program to be executed by a computer of an information processing system including at least one server and a plurality of terminal apparatuses, the information processing program, when executed, causing the computer to perform operations comprising:

storing a production content in a storage unit of the server in accordance with an operation on each terminal apparatus;

acquiring data, from a plurality of terminal apparatuses having made requests, with which each terminal apparatus selects a material content from among a plurality of material contents to be used as materials to create the production content and thereby makes a request to the server for creation of a production content associated with the selected material content; and presenting a state of each of the requests to the plurality of terminal apparatuses from which the requests are made and to other terminal apparatuses.

17. A non-transitory computer-readable storage medium having stored therein an information processing program to be executed by a computer of an information processing system including at least one server and a plurality of terminal apparatuses, the server comprising a production content storage control unit configured to store a production content in a storage unit of the server, the information processing program, when executed, causing the computer to perform operations comprising:

making a request to the server for creation of a production content associated with material content selected from a plurality of material contents to be used as materials to create the production content;

after a material content has been selected from among the plurality of material contents to be used as materials to create the production content and requests have been made from other apparatuses to the server for creation of production content associated with the selected material content, acquiring, from the server, a state of the requests made by the other apparatuses and presenting the state of the requests; and in accordance with an operation, setting, at least from among the plurality of material contents for which the requests are allowed to be made, a material content to be associated with the production content to be stored in the storage unit, and storing the production content together with data representing the material content in the storage unit of the server.

18. An information processing method comprising:

storing a production content in a storage unit of a server in accordance with operations of a plurality of terminal apparatuses;

selecting, by each apparatus from a plurality of terminal apparatuses, a material content from among a plurality of material contents to be used as materials to create the production content, thereby, in accordance with an operation on the respective terminal apparatus, making requests to the server for creation of a production content associated with the selected material content; and presenting a state of each of the requests to the plurality of terminal apparatuses from which the requests are made and to other terminal apparatuses.

19. The information processing system according to claim 2, further comprising:

a requesting user list storage unit configured to store a request ranking list for managing the plurality of material contents by ranking them in accordance with a number of requests made from the terminal apparatuses.

20. The information processing apparatus according to claim 12, wherein the request unit is further configured to make a request to the server for a request ranking list stored on the server, the request ranking list managing the plurality of material contents by ranking them in accordance with a number of requests made from the terminal apparatuses.

21. The information processing apparatus according to claim 14, further comprising a ranking list request unit configured to request from the server a request ranking list, the request ranking list managing the plurality of material contents by ranking them in accordance with a number of requests made from the terminal apparatuses.

22. The information processing system according to claim 1, wherein:
the request unit makes the request for creation of the production content to be used in predetermined information processing of a game application; and
the information processing system further comprises:
an upload unit configured to, in response to a request from another terminal apparatus that did not request for creation of the production content, upload the stored production content to the another terminal apparatus to perform the information processing, using the production content, on the basis of the game application executed on the another terminal apparatus.

23. The information processing system according to claim 13, wherein:
the requests by the terminal apparatuses having made the request are made for production content to be used in a game application; and
the server further comprises:
an upload unit configured to upload the stored production content to the terminal apparatuses having made the requests to perform information processing, using the production content, in the game application executed on the respective terminal apparatus.

* * * * *